United States Patent
Willis et al.

(10) Patent No.: US 6,665,720 B1
(45) Date of Patent: Dec. 16, 2003

(54) ADAPTER FOR A HOME POWER LINE NETWORK

(75) Inventors: Tom Willis, Portland, OR (US); David Kaysen, Hillsboro, OR (US); Debra Cohen, Santa Clara, CA (US); Robert Hunter, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/399,931

(22) Filed: Sep. 21, 1999

(Under 37 CFR 1.47)

(51) Int. Cl.[7] .............................................. G06F 15/16
(52) U.S. Cl. ....................... 709/227; 709/218; 709/219; 340/310.01; 340/310.02; 340/310.03; 340/310.04; 340/310.05; 340/310.06; 340/310.08
(58) Field of Search ................................. 709/246, 236, 709/250, 227, 216–219; 340/310.08, 310.01–310.06; 370/464, 479; 455/402; 375/259; 710/11

(56) References Cited

U.S. PATENT DOCUMENTS

| | | | | |
|---|---|---|---|---|
| 5,063,494 A | * | 11/1991 | Davidowski et al. ....... 709/246 |
| 5,777,544 A | * | 7/1998 | Vander Mey et al. ... 340/310.06 |
| 5,835,005 A | * | 11/1998 | Furukawa et al. ..... 340/310.01 |
| 5,842,039 A | * | 11/1998 | Hanaway et al. ............. 710/11 |
| 5,859,596 A | * | 1/1999 | McRae .................. 340/310.01 |
| 5,937,342 A | * | 8/1999 | Kline .......................... 455/402 |
| 5,991,885 A | * | 11/1999 | Chang et al. ................ 713/300 |
| 6,005,476 A | * | 12/1999 | Valiulis .................. 340/310.06 |
| 6,012,086 A | * | 1/2000 | Lowell ........................ 709/218 |
| 6,021,137 A | * | 2/2000 | Kato et al. ................... 370/479 |
| 6,389,463 B2 | * | 5/2002 | Bolas et al. ................ 709/227 |

* cited by examiner

Primary Examiner—Wellington Chin
Assistant Examiner—Chuong Ho
(74) Attorney, Agent, or Firm—Fish & Richardson P.C.

(57) ABSTRACT

An element for an in home power line network is housed within the power supply of laptop computer. The element communicates with the power line and carries out network operations over that line. The device also includes logic therein which automatically detects the format of the network being communicated with so that a number of different network types can be automatically connected.

7 Claims, 2 Drawing Sheets

ADAPTER FOR A HOME POWER LINE NETWORK

The present invention teaches an adapter for a home power line network that determines the kind of Power line network being communicated with and automatically enables transmission.

BACKGROUND

One existing home network operation operates over the power lines. The network operates by modulating information onto the existing power lines at a different frequency than the AC power. An add-in card for desktop PC's can be used, or a component within a motherboard or a PCMCIA solution for a notebook computer. This device can have a connector that is connected to the power line.

It is desirable to simplify the connection and the hardware as much as possible.

SUMMARY

The present specification teaches a power line network system, that has a stand alone power supply for a personal computer. The stand alone power supply has a housing that holds a power supply and a device which communicates network information onto a AC power line. The power supply also has a connector. A computer is connected to the connector to receive power and network information signals from the stand alone power supply.

Another aspect incorporates an element into the external power supply that automatically determines which of a number of different predetermined networks are existing on the power supply line.

BRIEF DESCRIPTION OF THE DRAWINGS

These and other aspects will now be described in detail with reference to the accompanying drawings, wherein.

DETAILED DESCRIPTION

Figure 1:
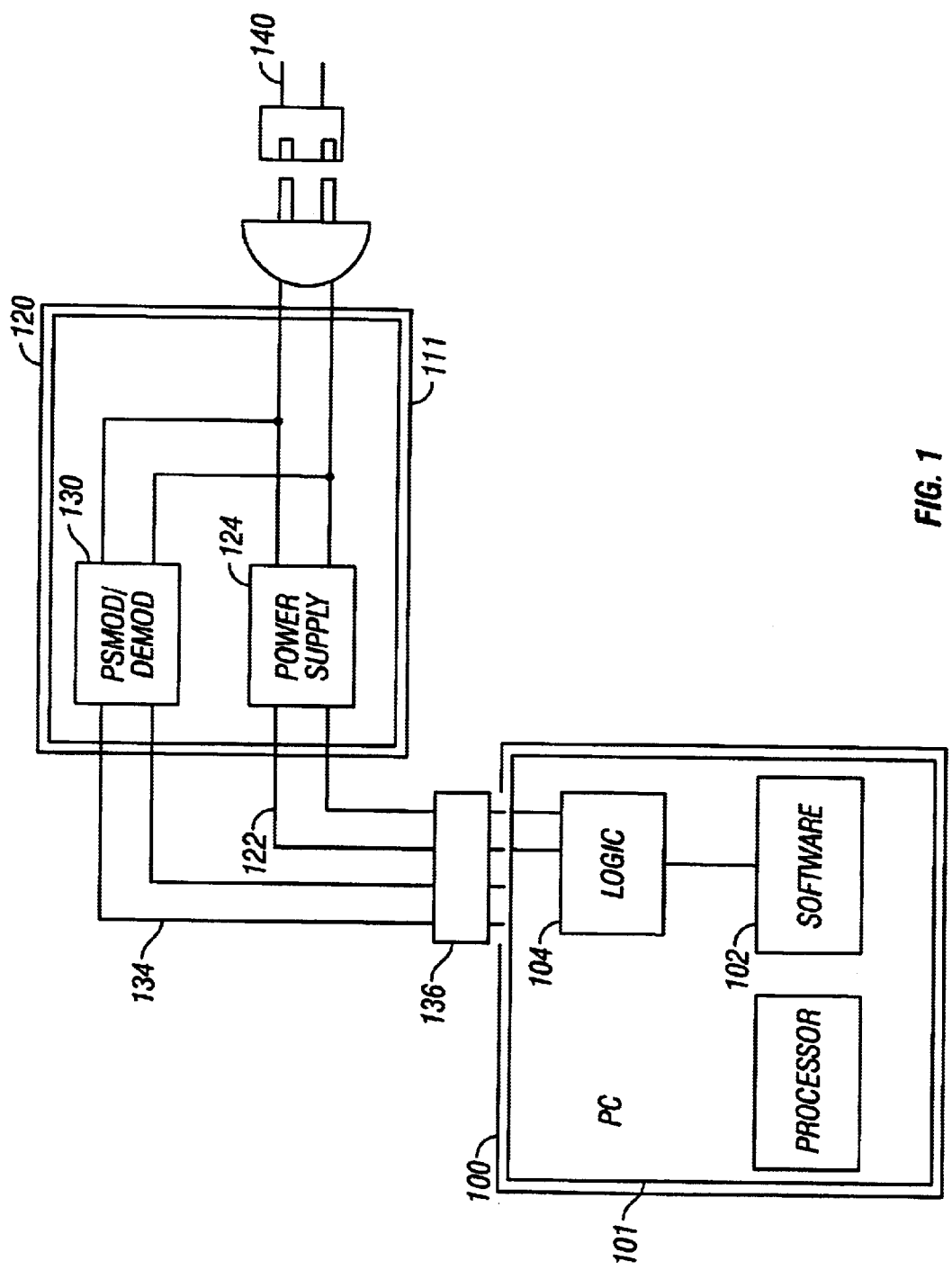
FIG. 1 shows a basic block diagram of the system using a laptop computer and an external power supply.

The basic system is shown in FIG. 1 which shows a personal computer 100, here a laptop, powered by a power supply 120 that is connected to the AC Power line 140 via connector plug 130. The laptop is within its own housing 101. According to this system, the PC operates a software layer 102 which runs certain application programs. The power supply 120 is held within a housing 111, and within that housing includes multiple parts. A power supply portion 124 can transform the power from the AC power line 140 into a different voltage or current that is output as power 122 to the laptop.

Power supply 120 also includes a power supply modulator/demodulator 132 which is connected in parallel to the power supply line, and which receives additional modulated information from the power supply line. Different ways of modulating information on and receiving modulated information from the power supply line are known. One such power supply modulator 132 is the model AN1000 chipset from Adaptive Networks, Cambridge, Mass. Any other such device can alternately be used. These power supply modulator devices modulate information onto the power supply line at a different frequency than the frequency of the actual power line. The output of power supply modulator 132 is shown as a dual line output 134. The power output 122 and power supply information output 134 are combined on to a single, multi pin connector 136.

Connector 136 connects to the corresponding receptacle for receiving power and data in the PC 108. The power on line 122 is used to power the components in the PC. The logic signal 134 is connected to line 110, that in turn connects to logic module 104. Logic module 104 can include an optical isolator, a line receiver, or more sophisticated structure. The operation of logic module 104 is controlled by software 102 which includes the application layer software. This application layer software runs according to the flowchart of FIG. 2.

Operation in many different formats of network communication is well known. This system can operate in any of these different communication protocols as controlled by the operating software.

The software sends polls in different formats, to determine if it receives answers to those polls. Step 200 shows the initial step of sending a poll in power line Ethernet format. Step 202 waits for a response for a specified time out period. If a response is received, then an Ethernet power line mode is established at step 204, and the appropriate flag is set. Thereafter, all communications with the network are carried out in Ethernet power line mode.

Step 206 is carried out if there is no response to step 202. At step 206, a power line network-at-home poll is carried out, and the response is monitored at step 208. If received, then power line network at home mode is sent at step 210. Any other known or custom format can be polled for using this system. The system operates by polling for each network protocol, and establishing a response based on the responses.

Step 212 generically shows polling for other requests, and checking for responses at step 214.

If no responses are received at step 220, then the system eventually determines that no network is installed. This would happen, for example when the user is in an airport or at some other location where no network is installed.

Figure 2:
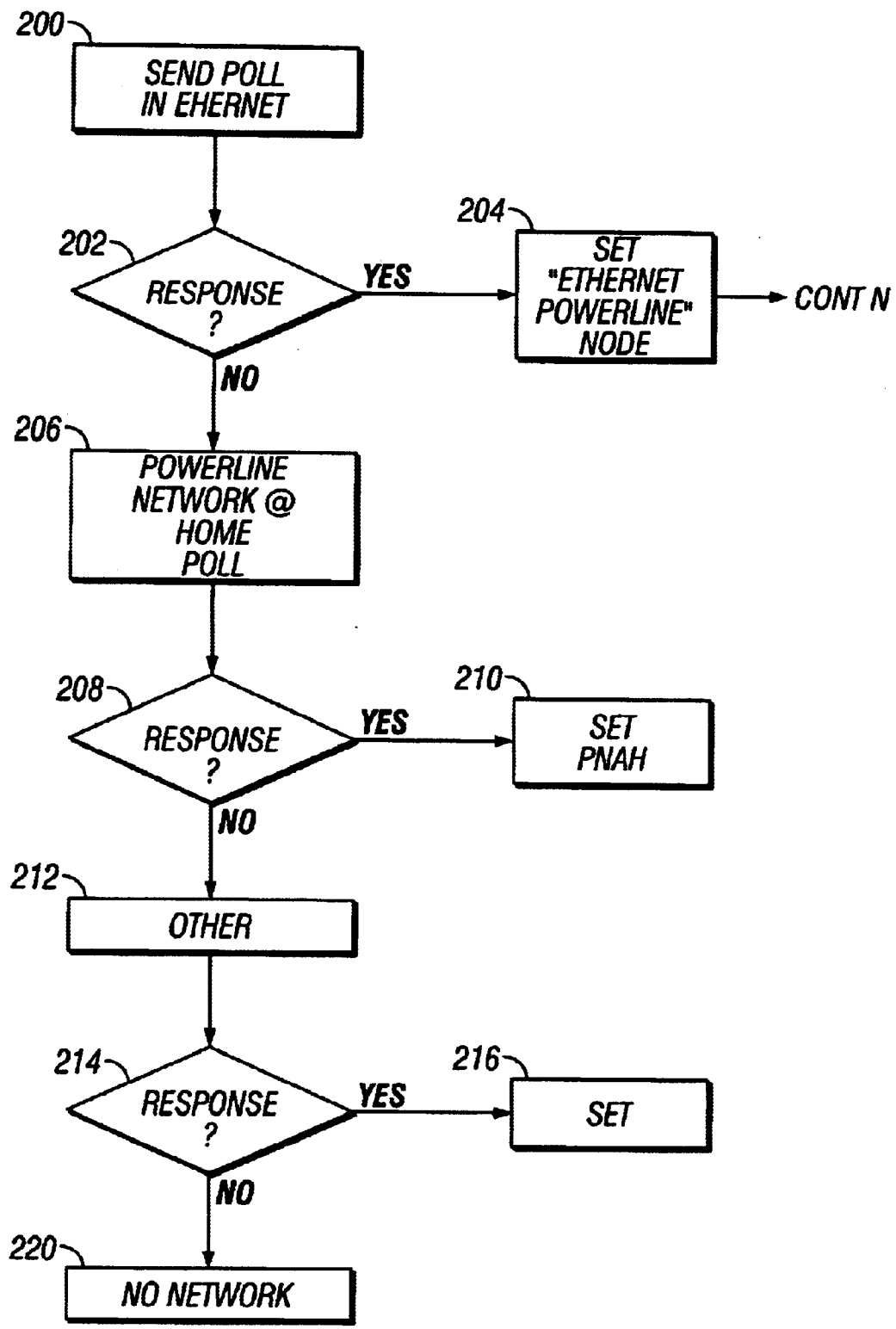
FIG. 2 shows a flowchart of operation of this system.

FIG. 2 shows polling for each network format separately and detecting whether a response has been received. However it should be understood that the FIG. 2 flowchart could be modified to send all polls quickly and then wait for any and all responses. This could operate faster and also enable determining if multiple different networks were installed on the same power line.

The system shown in FIG. 2 establishes a hierarchy indicating which network should be accepted based on the order of polling. The first network to answer and establish a network connection becomes the operating network. Operation is thereafter carried out with that found network. The flag set at step 204, 210, 216 is then used to indicate that further operations should be carried in that specified format, and that specified format is programmed into the logic module 104.

The logic module 104 can include, for example, a multifunction network communication device, including a number of different chipsets which operate in a number of different formats. Alternately, the logic 104 can be a reconfigurable application specific integrated circuit ("ASIC") or field programmable gate array ("FPGA"), or a digital signal processor which is reconfigured to emulate any desired network mode.

Other embodiments are within the disclosed embodiment. For example while the specification describes operating in software, it should be understood that dedicated hardware within the computer could be used for this operation. For example, hardware defined by hardware definition language could be used for this purpose. All such modifications are intended to be encompassed within the claims, in which:

What is claimed is:

1. A power line network system, comprising:

a stand alone power supply for a personal computer, having a housing, and within said housing having a power supply which converts AC power into a different voltage, and produces a power output and a device which communicates network information onto a AC power line, said power supply also having a connector; and a computer, connected to said connector to receive power and network information signals from said stand alone power supply; and a network detecting element, located in said stand alone power supply, that automatically detects a network protocol among a plurality of different network protocol of a power line network and communicates using the automatically detected protocol.

2. A system as in claim 1, wherein said network detecting element operates to poll for a specified application network protocol, determine if a response to said poll is received, and if so, establish said specified protocol as a protocol to be used for said network information.

3. A system as in claim 1 wherein said connector is a single connector which includes both power supply signals and data signals from said network information.

4. A method of operating a power line network, comprising:

automatically detecting a kind of network to which said computer is currently attached; and configuring said computer to communicate with said kind of network; and communicating with said network after said automatically detecting and said configuring wherein said automatically detecting includes sending a first poll, waiting for an answer, and then sending a second poll, wherein said computer is a portable type computer with a first housing, and a separate power supply in a second housing which is separate from said first housing, and wherein said second housing also includes a circuit for producing information of a format to be introduced onto said AC power line.

5. A method as in claim 4, wherein said automatically detecting comprises powering said computer using the power supply, and automatically detecting said kind of network based on said communicating.

6. A method of operating a power line network, comprising:

connecting a computer to said power line network; and automatically detecting a format of said network using said computer wherein the computer is a portable computer with a first housing housing the computer element, a second housing, totally separate from the first housing and housing a power supply element therein, and wherein at least a part of said automatic detecting is carried out in said second housing.

7. A method as in claim 6 further comprising communicating with said network based on said automatically detecting.

* * * * *